(12) United States Patent
Kelley et al.

(10) Patent No.: US 8,997,198 B1
(45) Date of Patent: Mar. 31, 2015

(54) TECHNIQUES FOR SECURING A CENTRALIZED METADATA DISTRIBUTED FILESYSTEM

(71) Applicant: EMC Corporation, Hopkinton, MA (US)

(72) Inventors: James Alan Kelley, Waltham, MA (US); Roberto Tamassia, Providence, RI (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 13/731,858

(22) Filed: Dec. 31, 2012

(51) Int. Cl.
*H04L 29/06* (2006.01)
*G06F 21/31* (2013.01)

(52) U.S. Cl.
CPC ...................................... *G06F 21/31* (2013.01)
USPC ................................................. 726/10; 726/4

(58) Field of Classification Search
USPC ............................................................ 726/10
See application file for complete search history.

(56) References Cited

U.S. PATENT DOCUMENTS

| | | | | |
|---|---|---|---|---|
| 2002/0078244 | A1* | 6/2002 | Howard | 709/248 |
| 2003/0208681 | A1* | 11/2003 | Muntz et al. | 713/179 |
| 2005/0074126 | A1* | 4/2005 | Stanko | 380/279 |
| 2007/0189531 | A1* | 8/2007 | Lecomte et al. | 380/237 |
| 2007/0294537 | A1* | 12/2007 | Peyravian et al. | 713/178 |
| 2009/0112921 | A1* | 4/2009 | Oliveira et al. | 707/103 R |

OTHER PUBLICATIONS

Amazon Web Services, "Amazon Elastic Compute Cloud (Amazon EC2)," 11 pages, Nov. 1, 2012; https://web.archive.org/web/20121101045449/http://aws.amazon.com/ec2/; accessed on May 28, 2014.

Andrew Becherer, "Hadoop Security Design: Just Add Kerberos? Really?", http://media.blackhat.com/bh-us-10/whitepapers/Becherer/BlackHat-USA-2010-Becherer-Andrew-Hadoop-Security-wp.pdf, 2010, 8 pages, 1SEC Partners, Inc.

Daniel J. Bernstein, "The Salsa20 Family of Stream Chiphers." In Matthew Robshaw and Olivier Billet, editors New Stream Cipher Designs, vol. 4986 of Lecture Notes in Computer Science, pp. 84-97, Springer, Heidelberg, 2008.

Andrea Bittau, et al., "The Case for Ubiquitous Transport-Level Encryption." In USENIX Security, pp. 26-42, 2010.

Dhruba Borthakur, "HDFS Architecture Guide," https://web.archive.org/web/20121016001200/http://hadoop.apache.org/docs/hdfs/current/hdfs_design.htm1,13 pages, Oct. 16, 2012.

(Continued)

*Primary Examiner* — Yogesh Paliwal
(74) *Attorney, Agent, or Firm* — BainwoodHuang

(57) ABSTRACT

A method is performed by a data server of a plurality of data servers connected to a network, the data server including data storage managed by a remote metadata server, the metadata server managing storage of data across the plurality of data servers. The method includes (a) receiving, via the network, an access request from a client, the access request requesting access to a portion of the data storage of the data server, (b) testing whether the access request includes a data server specific token authenticating that the client has been authorized by the metadata server to access the portion of data storage, and (c) in response to testing, providing the client with access to the portion of data storage on condition that the access request includes the token authenticating that the client has been authorized by the metadata server to access the portion of data storage.

19 Claims, 5 Drawing Sheets

(56) References Cited

OTHER PUBLICATIONS

Dhruba Borthakur, et al., "Apache Hadoop Goes Realtime at Facebook." In SIGMOD '11, pp. 1071-1080, ACM, Athens, Greece; 2011.
"Kosmos Distributed Filesystem," http://code.google.com/p/kosmosfs/, 1 page, Accessed on May 28, 2014.
Aaron Cordova, "Hadoop World 2009: MapReduce over Tahoe—a Least-Authority Encrypted Distributed Filesystem," Oct. 2, 2009, http://blog.cloudera.com/resource/hw09_mapreduce_over_tahoe/.
Jens Dittrich, et al., "Hadoop++: Making a Yellow Elephant Run Like a Cheetah (Without It Even Noticing)," Sep. 2010; Proceedings of the VLDB Endowment, vol. 3, No. 1, pp. 518-529.
C. Chris Erway, et al., "Dynamic Provable Data Possession." In CCS '09, pp. 213-222, Nov. 2009; ACM, Chicago, Illinois.
Marc Eshel, et al., "Panache: A Parallel File System Cache for Global File Access." In USENIX FAST, 14 pages, 2010.
F. John Krautheim, "Private Virtual Infrastructure for Cloud Computing." In Proceedings of the 2009 USENIX Workshop on Hot Topics in Cloud Computing, HotCloud '09, Berkeley, 2009. USENIX Association, 5 pages.
Debessay Fesehaye, et al., "A Scalable Distributed File System for Cloud Computing," 8 pages.; 2010, Technical Report, University of Illinois at Urbana-Champaign; http://www.ideals.illinois.edu/handle/2142/15200.
Sanjay Ghemawat, et al., "The Google File System." In SOSP '03, pp. 29-43, Oct. 2003; ACM; Bolton Landing, New York.
Michael T. Goodrich, et al., "Athos: Efficient Authentication of Outsourced File Systems." ISC 2008, vol. 5222 of LNCS, pp. 80-96, Heidelberg, 2008. Springer.
Hadoop, "Welcome to Apache™ Hadooper®!", https://web.archive.org/web/20121101091715/http://hadoop.apache.org/, Nov. 1, 2012, Accessed on May 28, 2014.
Dawei Jiang, et al., "The Performance of MapReduce: An In-Depth Study," Sep. 2010; Proceedings of the VLDB Endowment, vol. 3, No. 1, pp. 472-483.
Anuj Gupta, et al., "Fine-Grained Access Control with Hive," 10 pages, Jul. 2010.; downloaded from https://web.archive.org/web/20120714071653/http://cs.utdallas.edu/secure-cloud-repository/Hive-AC/hive-ac.html.
Donald Kossmann, et al., "Cloudy: A Modular Cloud Storage System," Sep. 2010; Proceedings of the VLDB Endowment, vol. 3, No. 2, pp. 1533-1536.
T. Krovetz, "UMAC: Message Authentication Code Using Universal Hashing." RFC 4418 (Informational), 25 pages, Mar. 2006; The Internet Society; http://www.ietf.org/rfc/rfc4418.
Jinyuan Li, et al., "Secure Untrusted Data Repository (SUNDR)," In USENIX OSDI '04, pp. 121-136, 2004.
Wen-Syan Li, et al., "Xbase: Cloud-Enabled Information Appliance for Healthcare." In EDBT, pp. 675-680, 2010.
David Mazieres, et al., "Separating Key Management From File System Security." Operating Systems Review 34 (5):124-139, Dec. 1999; ACM, Kiawah Island, South Carolina.
"Welcome to the Home of OpenAFS," https://web.archive.org/web/20121110101156fw_/http://www.openafs.org/pages/; 7 pages, Nov. 10, 2012, Accessed on May 28, 2014.
Charalampos Papamanthou, et al., "Authenticated Hash Tables." In CCS '08, pp. 437-448, 2008; ACM, Alexandria, Virginia.
Andrew Pavlo, et al., "A Comparison of Approaches to Large-Scale Data Analysis," In Proc. SIGMOD Int. Conf. on Management of Data, pp. 165-178, 2009; ACM, Providence, Rhode Island.
Bo Peng, et al., "Implementation Issues of a Cloud Computing Platform." Bulletin of the IEEE Computer Society Technical Committee on Data Engineering, 8 pages, 2009.
Thomas Ristenpart, et al., "Hey, You, Get Off My Cloud: Exploring Information Leakage in Third-Party Compute Clouds." In CCS '09, pp. 199-212, 2009; ACM, Chicago, Illinois.
Francisco Rocha, et al., "Lucy in the Sky Without Diamonds: Stealing Confidential Data in the Cloud." In Proceedings of the 1st International Workshop on Dependability of Clouds, Data Centers and Virtual Computing Environments, Hong Kong, pp. 129-134, 2011.
Indrajit Roy, et al., "Airavat: Security and Privacy for MapReduce," In USENIX NSDI, pp. 297-312, 2010.
S. Shepler, et al., "Network File System (NFS), Version 4 Protocol," RFC 3530, http://tools.ietf.org/html/rfc3530, 276 pages, Apr. 2003, Accessed on May 28, 2014; The Internet Society.
Nuno Santos, et al., "Towards Trusted Cloud Computing." In Proceedings of the USENIX Workshop on Hot Topics in Cloud Computing, HotCloud '09, Berkeley, 5 pages, Jun. 2009. USENIX Association.
Frank Schmuck, et al., "GPFS: A Shared-Disk File System for Large Computing Clusters." Proceedings of the Conference on File and Storage Technologies (FAST'02), Jan. 2002, Monterey, CA, pp. 231-244. (USENIX, Berkeley, CA.).
S. Shepler, et al., "Network File System (NFS), Version 4 Minor Version 1 Protocol;" RFC 5661, http://tools.ietf.org/html/rfc5661; 618 pages, Jan. 2010; Internet Engineering Task Force.
Konstantin V. Shvachko, "HDFS Scalability: the Limits to Growth." USENIX ;login, 35(2):6-16, 2010.
Ashish Thusoo, et al., "Hive—A Petabyte Scale Data Warehouse Using Hadoop", In IEEE ICDE, pp. 996-1005, 2010.
TPlatform Project; "TPlatform: A Cloud Computing Platform." https://web.archive.org/web/20100428023229/http://net.pku.edu.cn/~webg/tplatform; 1 page, Apr. 28, 2010, Accessed on May 28, 2014; Tianwang Group.
Trusted Computing Group, "Trusted Platform Module (TPM) Summary," 3 pages, Apr. 2008; Downloaded from http://www.trustedcomputinggroup.org/resources/trusted_platform_module_tpm_summary.
Zooko Wilcox-O'Hearn, et al., "Tahoe—The Least-Authority Filesystem." In StorageSS '08, pp. 21-26, 2008; ACM, Fairfax, Virginia.
Timothy Wood, et al., "The Case for Enterprise-Ready Virtual Private Clouds." In Proceedings of the USENIX Workshop on Hot Topics in Cloud Computing, HotCloud '09, Berkeley, 5 pages, Jun. 2009. USENIX Association.
Yahoo, "Hadoop at Yahoo!";https://web.archive.org/web/20101013022135/http://developer.yahoo.com/hadoop/. 2 pages, Oct. 13, 2010.
James Kelley, et al., "Hardening Access Control and Data Protection in GFS-like File Systems", published in Lecture Notes in Computer Science (LNCS) vol. 7459, pp. 19-36, 17th European Symposium on Research in Computer Security (ESORICS), Pisa, Italy, Sep. 10-12, 2012, Proceedings, Springer-Verlag Berlin Heidelberg 2012, Sara Foresti, Moti Yung, Fabio Martinelli, Eds.

* cited by examiner

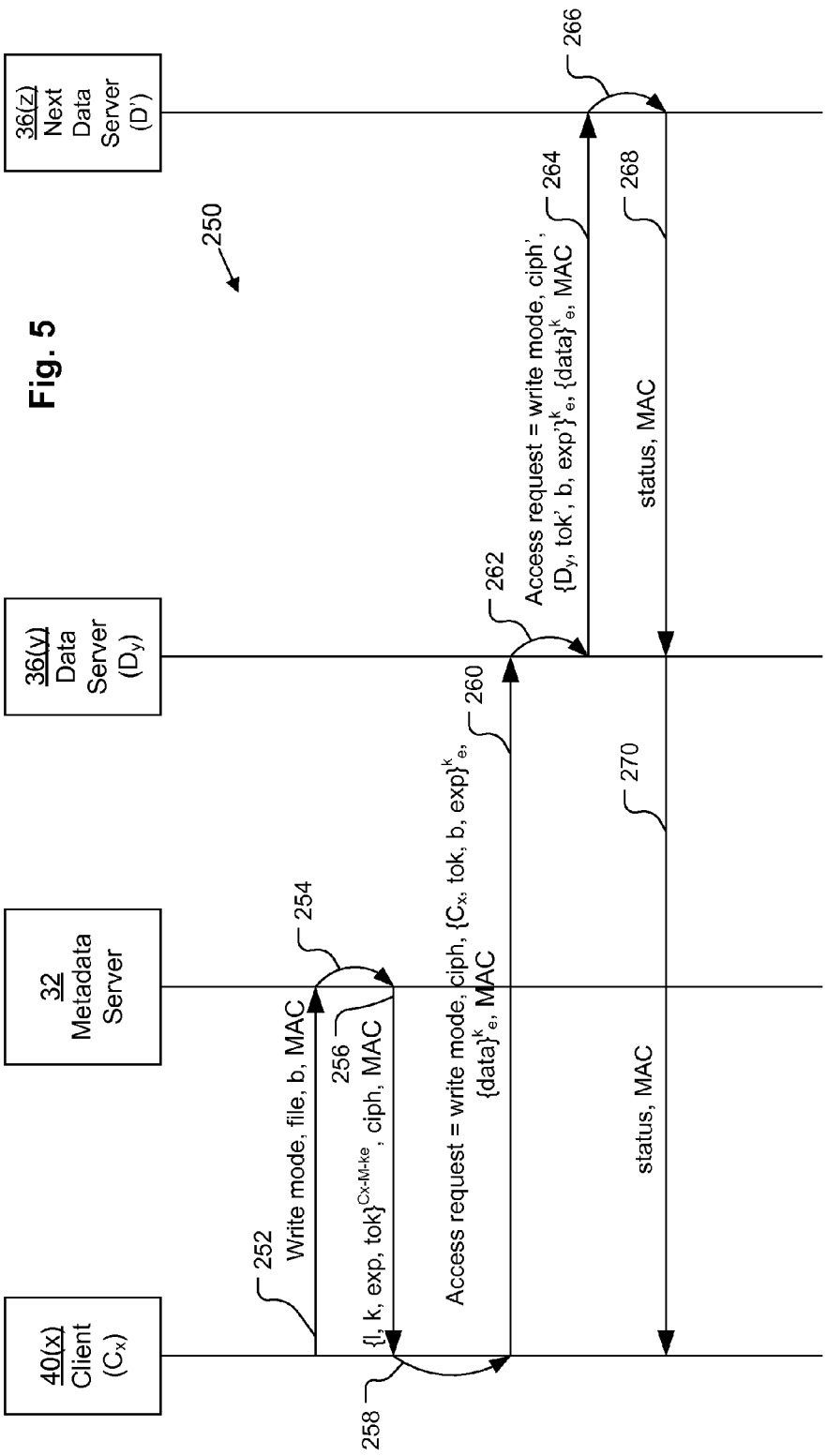

TECHNIQUES FOR SECURING A CENTRALIZED METADATA DISTRIBUTED FILESYSTEM

STATEMENT OF GOVERNMENT RIGHTS

This invention was made with government support under grants CNS-1012060, CNS-1012798, and CNS-1012910 awarded by the U.S. National Science Foundation. The government has certain rights in the invention. Applicants make no admission about what the extent of those rights is.

BACKGROUND

A centralized metadata distributed filesystem (CMDFS) is a filesystem for storing data across many data servers in a distributed fashion and using a centralized metadata server that manages the filesystem. Examples include the Google File System and the Hadoop Distributed File System. When a client wishes to access data of the CMDFS, the client sends a request to the metadata server, which responds by sending metadata to the client indicating a data server from which to obtain the data. The client is then able to communicate directly with the appropriate data server to obtain the data.

Some systems additionally provide security for a CMDFS by allowing the metadata server to determine if the client has permission to access the files it is looking for and then providing a security ticket, which the client is able to use to access the data. A single ticket is used for any data block of a file—even if the block is replicated across several data servers, the same ticket is used to allow access to any of the replicated blocks.

SUMMARY

Unfortunately, the above-described systems suffer from security-related deficiencies. For example, in the conventional systems, an attacker may easily register as a data server and obtain secured data. In addition, data is transmitted from the data servers to clients in plaintext, allowing an attacker to obtain the data by sniffing traffic. Further, since a single ticket may be shared among several data servers, certain cryptographic information needs to be shared among these data servers, complicating management and compromising security.

It would be desirable to provide a secured CMDFS with improved security features that avoids sniffing attacks and registration attacks and that also avoids sharing cryptographic information between all data servers. Thus, techniques are presented for the metadata server to provide specialized tokens that prove that a specific client is authorized to access particular data on a particular data server. Techniques are also presented for providing encrypted pathways between data servers and clients and for preventing unauthorized entities from registering as data servers.

One embodiment is directed to a method performed by a data server of a plurality of data servers connected to a network, the data server including data storage managed by a remote metadata server, the metadata server managing storage of data across the plurality of data servers. The method includes (a) receiving, via the network, an access request from a client, the access request requesting access to a portion of the data storage of the data server, (b) testing whether the access request includes a data server specific token authenticating that the client has been authorized by the metadata server to access the portion of data storage, and (c) in response to testing, providing the client with access to the portion of data storage on condition that the access request includes the token authenticating that the client has been authorized by the metadata server to access the portion of data storage. Other embodiments are directed to an apparatus and computer program product for carrying out the method. Some embodiments involve activity that is performed at a single location, while other embodiments involve activity that is distributed over a computerized environment (e.g., over a network).

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

FIGS. 3, 4, and 5 are sequence diagrams depicting example methods of various embodiments.

DETAILED DESCRIPTION

It is desired to provide a secured CMDFS with improved security features to avoid sniffing attacks and registration attacks. Thus, techniques are presented for the metadata server to provide specialized tokens that prove that a specific client is authorized to access particular data on a particular data server. Techniques are also presented for providing encrypted pathways between data servers and clients and for preventing unauthorized entities from registering as data servers.

Figure 1:
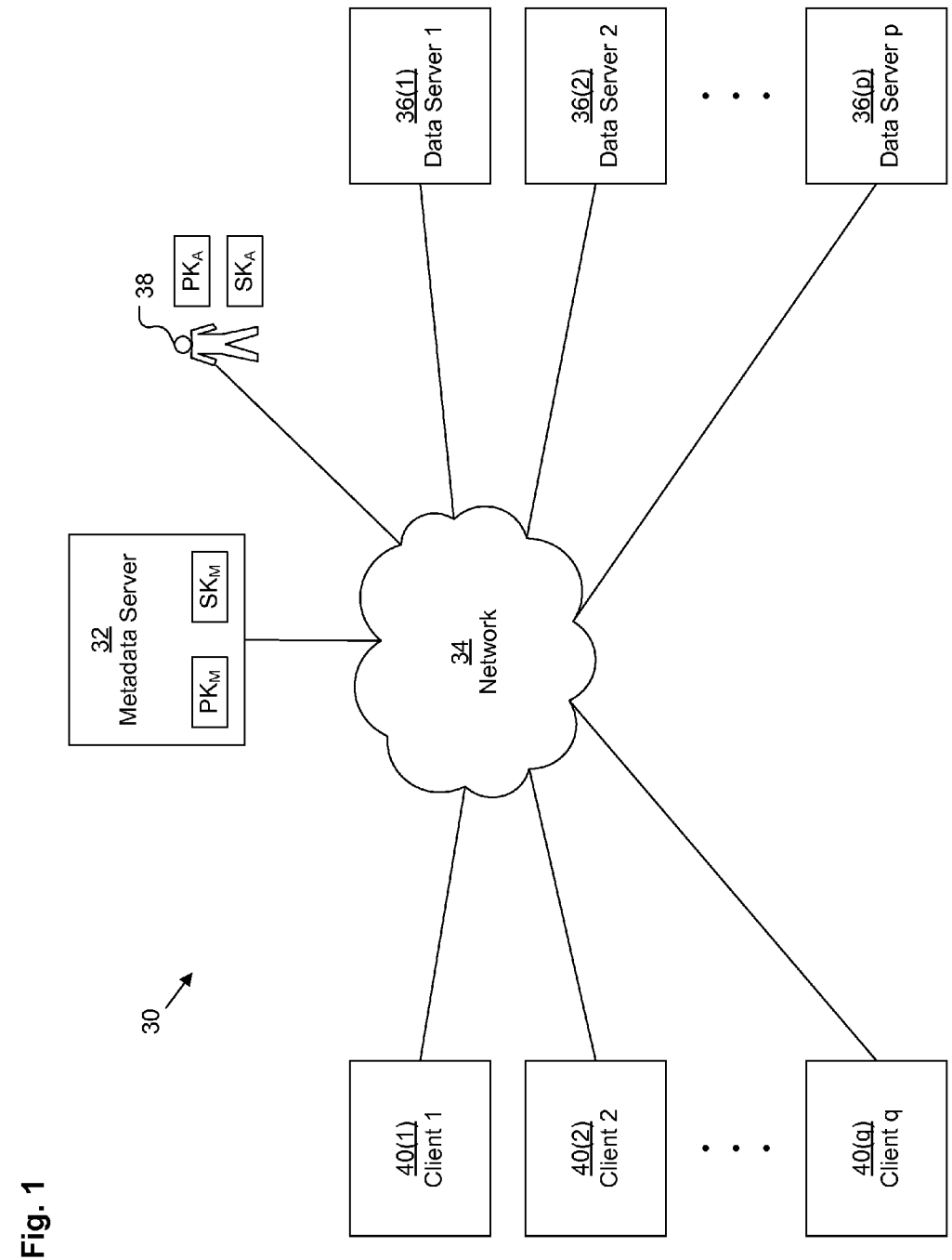
FIG. 1 is a block diagram depicting an example environment in which various embodiments may be practiced.

FIG. 1 depicts an example system 30 for use in performing various embodiments. System 30 includes a metadata server 32 connected to a network 34, which also connects to a set of clients 40 and data servers 36. A system administrator 38 also connects to network 34 (typically via a computer of some sort).

Network 34 may be any kind of network, such as, for example, a local area network, a wide area network, the Internet, a storage area network, a fabric of interconnected hubs and switches, etc. In some embodiments, in lieu of a network, direct point-to-point connections may be used.

Metadata server 32, data servers 36, and clients 40 may be any kinds of computing devices, such as, for example, personal computers, workstations, servers, enterprise servers, laptop computers, mobile computers, smart phones, tablet computers, etc. Metadata server 32 will typically be a server or enterprise server. Data servers 36 will also typically be servers or enterprise servers, such as, for example, a VNX series or VNXe series data storage system provided by the EMC Corp. of Hopkinton, Mass. Clients 40 will typically be personal computers, workstations, laptop computers, mobile computers, smart phones, or tablet computers.

In some embodiments, metadata server 32 has a public key $PK_M$ and a private key $SK_M$ associated with it, the private key $SK_M$ being known only to the metadata server 32 and the public key $PK_M$ being published for access by other entities. In some embodiments, the system administrator 38 has a public key $PK_A$ and a private key $SK_A$ associated with his account, the private key $SK_A$ being known only to the system administrator's account and the public key $PK_A$ being published for access by other entities.

Metadata server 32 is configured to manage data stored on data servers 36, typically as part of a CMDFS. The metadata server 32 also stores metadata associated with the data of the CMDFS. When a client 40 wishes to access data within the CMDFS, the client 40 sends a request to the metadata server 32, which, upon determining that permission exists, sends certain information back to the client 40 which enables the client to determine which data server 36 to access for the data and also enables the client 40 to form an authenticated request to access that data server 36 in a secure manner.

Figure 2:
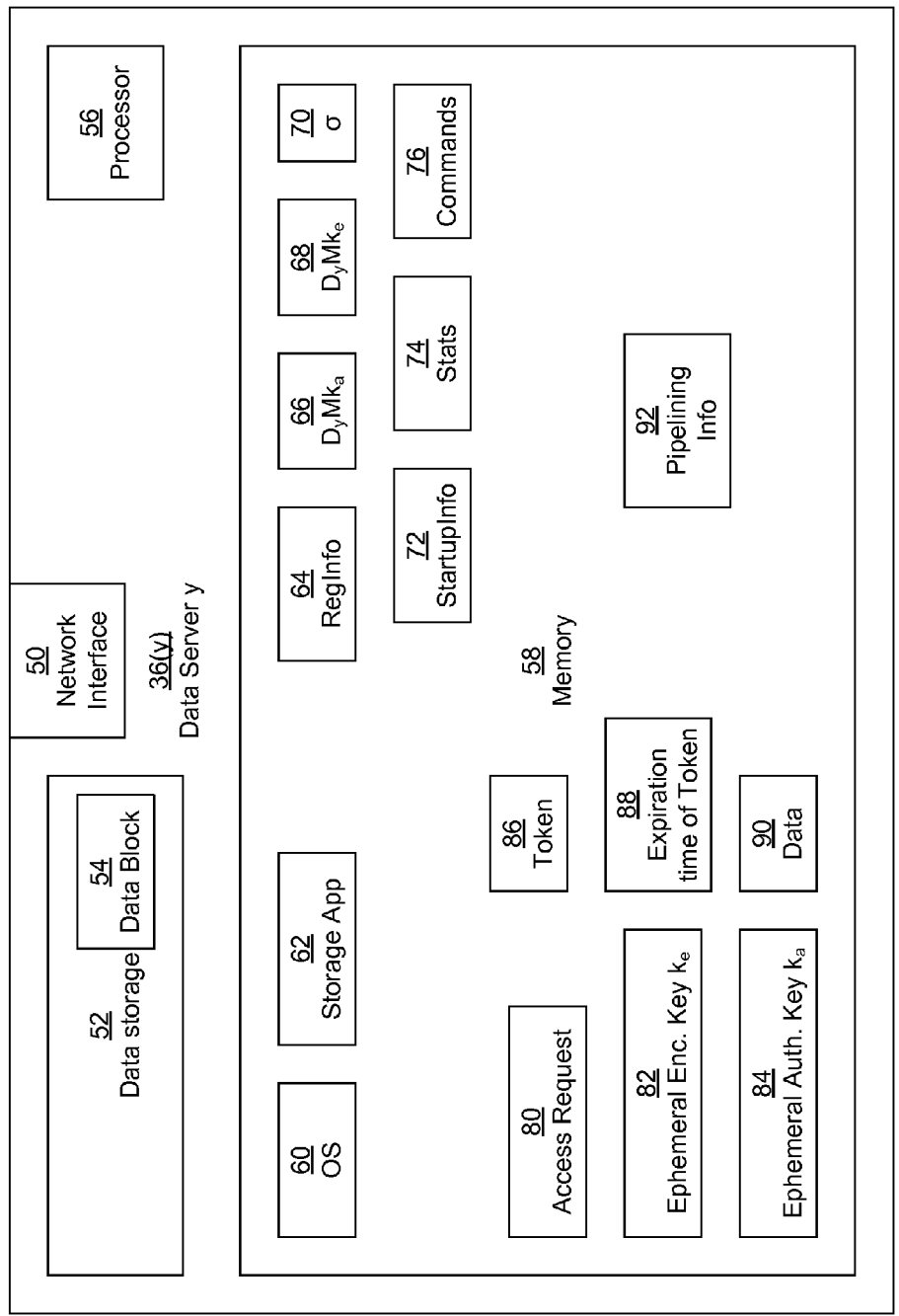
FIG. 2 is a block diagram depicting an example apparatus of various embodiments.

FIG. 2 depicts an example data server 36(y) in further detail. Data server 36(y) includes a network interface 50, data storage 52, a processor 56, and memory 58.

The network interface 50 connects the data server 36(y) to the network 34. Data storage 52 may take various forms, but it is typically formed from one or more persistent storage devices, such as hard disk drives and solid-state storage devices (SSDs) connected either by an internal bus or via a network (e.g., a storage area network). Data storage 52 may be arranged in a fault tolerant arrangement, such as in a redundant array of independent disks, as is well-known in the art. As depicted, data storage 52 stores at least one data block 54, such as, for example, a 64 megabyte chunk of data. In some embodiments, instead of storing blocks of data, data storage 52 stores files or database records.

Processor 56 may be any kind of processor or set of processors configured to perform operations, such as, for example, a microprocessor, a multi-core microprocessor, a digital signal processor, a collection of electronic circuits, or any combination of the above.

Memory 58 may be any kind of digital memory, such as, for example, random access memory, read-only memory, static memory, volatile memory, non-volatile memory, system memory, solid-state storage, disk-based storage, or some combination of the above. Memory 58 stores programs executing on processor 56 as well as data used by those programs. Memory 58 stores an operating system (OS) 60 and a storage application 62, both of which run on processor 56. Memory 58 may include both a system memory portion for storing programs and data in active use by the processor 56 as well as a persistent storage portion (e.g., solid-state storage and/or disk-based storage) for storing programs and data even while the data server 36(y) is powered off. However, in some embodiments, persistent storage portion may be included within data storage 52. OS 60 and storage application 62 are typically stored both in system memory and in persistent storage so that they may be loaded into system memory from persistent storage upon a system restart. Storage application 62, when stored in non-transient form either in system memory or in persistent storage, forms a computer program product. The processor 56 running the storage application 62 thus forms a specialized circuit constructed and arranged to carry out various processes described herein.

Memory 58 may also store various data, including registration information 64, an authentication key $D_y MK_a$ 66 shared with the metadata server 32, an encryption key $D_y MK_e$ 68 shared with the metadata server 32, a signature σ 70 provided by system administrator 38, startup information 72 provided by the metadata server 32, current system statistics 74, and commands 76 received from metadata server 32. D Memory 58 may also store various additional data received from clients 40 or other data servers 36, including an access request 80, an ephemeral encryption key $k_e$ 82, an ephemeral authentication key $k_a$ 84, a token 86, and expiration time 88 for the token 86, and data 90 read from or to be written to data storage 52. Memory 58 may also store pipelining information 92. Further details concerning the contents of memory 58 will be provided below.

Figure 3:
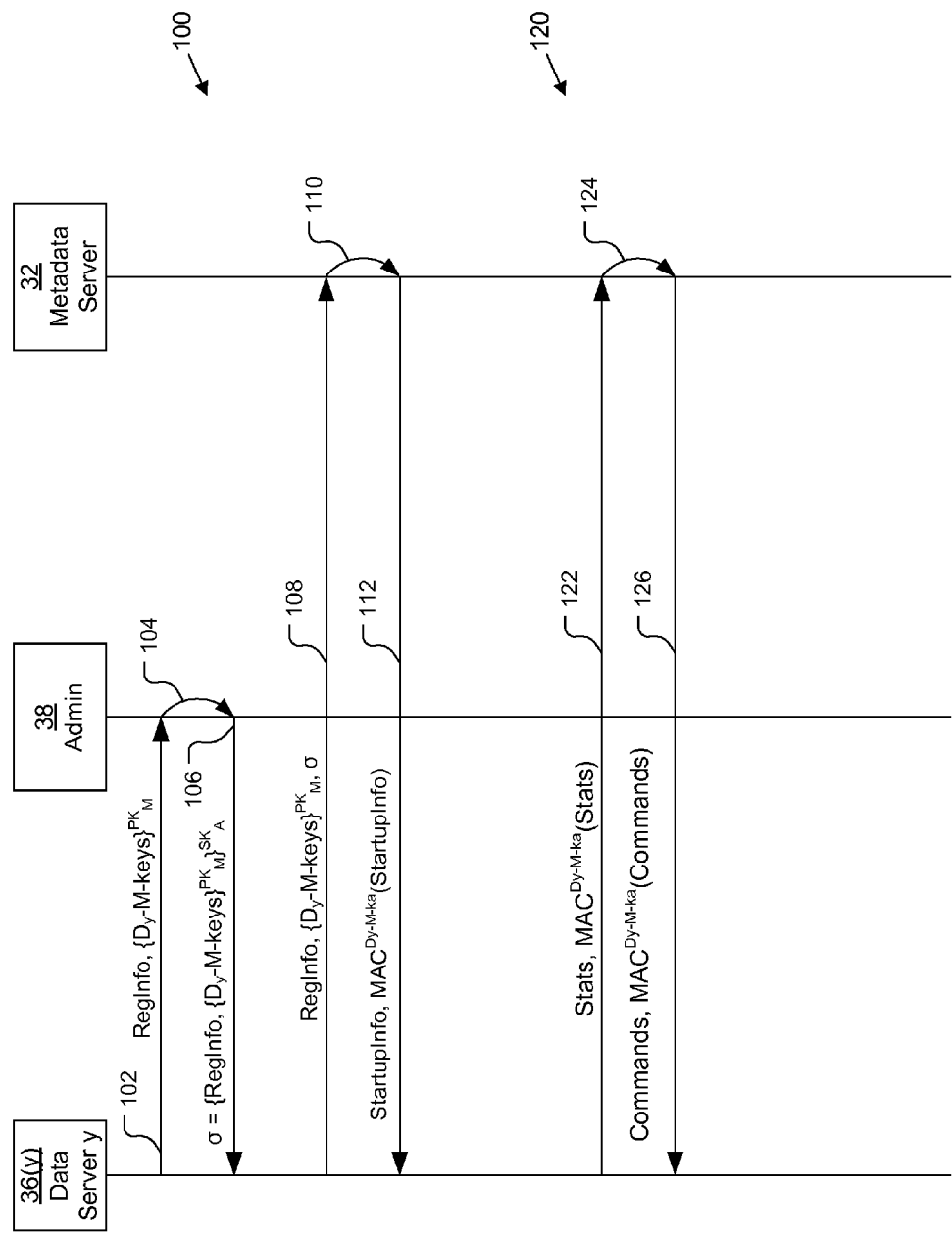

FIG. 3 depicts a method 100 for a data server 36(y) to register with metadata server 32 in order to prevent unauthorized attackers from serving as data servers 36. Data server 36(y) creates a preliminary registration request and sends it to system administrator 38 for signature as a signature request 102. Preliminary registration request 102 may include registration information 64 as well as an encrypted set of keys (depicted as $D_y$-M-keys) to be shared between data server 36(y) and metadata server 32. Depending on the embodiment, the set of keys $D_y$-M-keys may include one or more of authentication key $D_y$-M-$K_a$ 66 and encryption key $D_y$-M-K, 68. The set of keys $D_y$-M-keys is encrypted with the public key $PK_M$ of the metadata server 32 so that no other party can learn them. Upon receiving the preliminary registration request 102, the system administrator 38 performs step 104, in which the system administrator 38 first verifies that the data server 36(y) is authorized to serve as a data server for the CMDFS and then digitally signs the preliminary registration request 102 using the private key $SK_A$ of the system administrator 38 to yield signature σ 70. The system administrator 38 then sends a signature response 106 containing the signature σ 70 to data server 36(y).

It should be understood that communications 102 and 106, as well as all communications described in the document, may also include a nonce, n, in order to provide additional security by preventing replay attacks.

Upon receiving the signature σ 70, data server 36(y) stores the signature σ 70, and is able to form registration request 108 by combining the preliminary registration request with the signature σ 70. Data server 36(y) then sends registration request 108 to metadata server 32. Upon receiving registration request 108, metadata server 32 performs step 110, in which the metadata server 32 verifies the signature σ 70, decrypts the encrypted set of keys using $PK_M$ to yield $D_y$-M-keys, and internally registers the data server 36(y) as an authorized data server 36 if the MAC is verified. As part of the registration, metadata server 32 stores the decrypted set of keys $D_y$-M-keys in association with data server 36(y) and prepares startup information 72 for initialization of the data server 36(y). Metadata server 32 is then able to send a registration response 112 to the data server 36(y), the registration response 112 including the startup information 72 as well as a message authentication code (MAC) encoded with the authentication key $D_y M$-$K_a$ 66 shared between the metadata server 32 and the data server 36(y).

After registering with the metadata server 32, data server 36(y) periodically (e.g., once per second, minute, hour, day, etc.) performs a heartbeat procedure 120, also depicted in FIG. 3, to ensure that the data server 36(y) is still operating and it is not being spoofed by an attacker. In heartbeat procedure 120, data server 36(y) creates a heartbeat message 122 and sends it to metadata server 32. Heartbeat message 122 may include current system statistics 74 as well as a MAC encoded with the authentication key $D_y$-M-$K_a$ 66 shared between the metadata server 32 and the data server 36(y) to verify that the data server 36(y) is not being spoofed by another entity unaware of the authentication key $D_y$-M-$K_a$ 66. Upon receiving the heartbeat message 122, the metadata server 32 performs step 124, in which the metadata server 32 verifies that the heartbeat message 122 indicates that the data server 36(y) is still operating and it is not being spoofed by an attacker. Metadata server 32 may then create commands 76 to be executed by the data server 36(y), placing the commands 76 in a heartbeat response 126 together with the MAC encoded with the authentication key $D_y$-M-$K_a$ 66 shared between the metadata server 32 and the data server 36(y).

Figure 4:
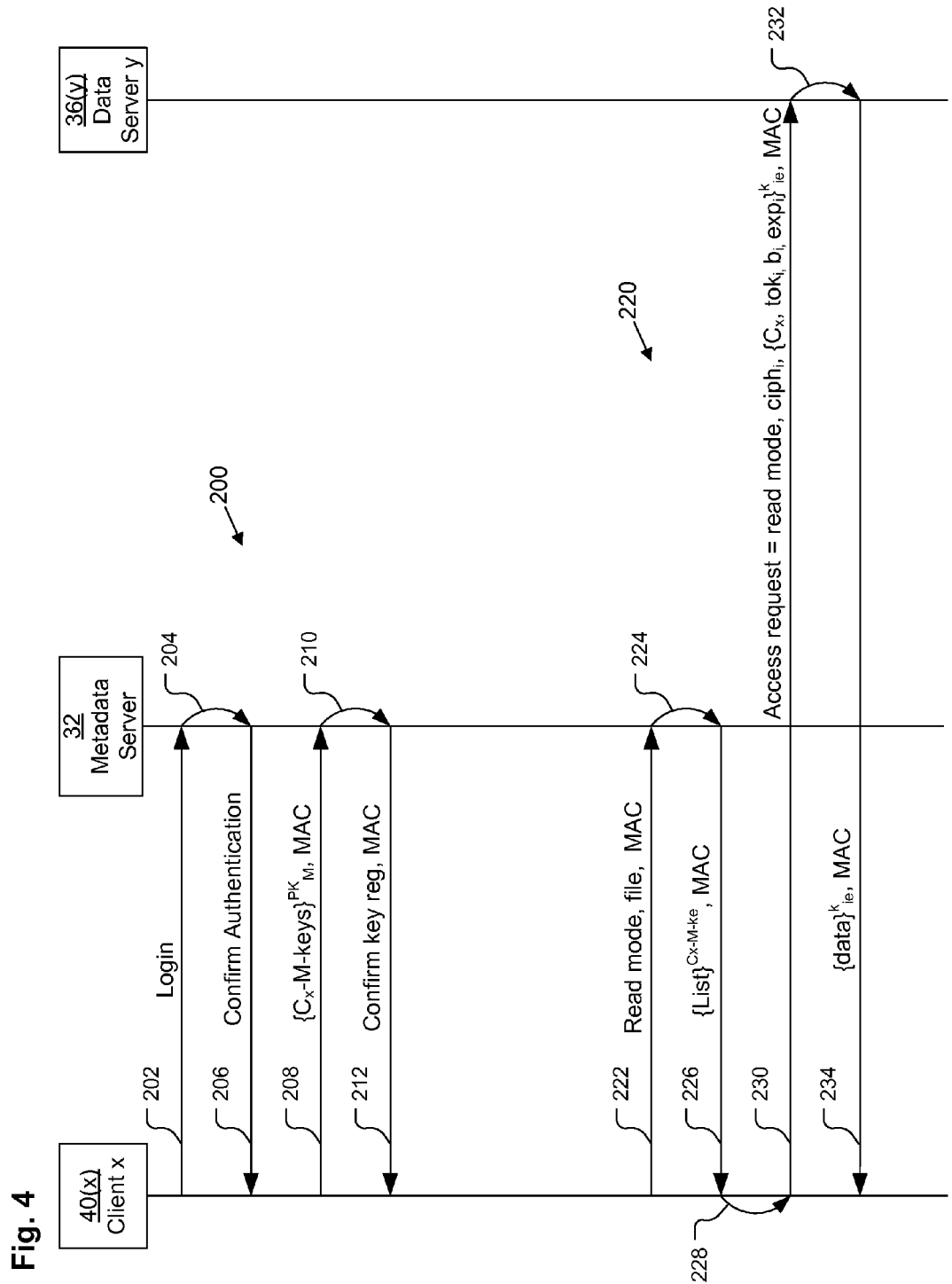

FIG. 4 depicts a registration procedure 200 for a client 40(x) to register with metadata server 32. Client 40(x) sends a login message 202 to metadata server 32. Login message 202 may include, for example, a username and password or other information to validate the identity of the client 40(x). Upon receiving the login message 202, the metadata server 32 performs step 204, in which the metadata server 32 validates the identification and verifies that the client 40(x) (or, in some arrangements that a particular user operating client 40(x)) is authorized to access at least a portion of the CMDFS, upon which, metadata server 32 sends back a confirmation of authentication 206. Then, the client 40(x) generates a set of set of keys (depicted as $C_x$-M-keys) to be shared between client 40(x) and metadata server 32. Depending on the embodiment, the set of keys $C_x$-M-keys may include one or more of authentication key $C_x$-M-$K_a$ and encryption key $C_x$-M-$K_e$. The set of keys $C_x$M-keys is encrypted with the public key $PK_M$ of the metadata server 32 so that no other party can learn them and then sent to metadata server 32 in a client registration message 208 together with a MAC encoded with the authentication key $C_x$M-$K_a$ shared between the metadata server 32 and the client 40(x). Upon receiving the client registration message 208, the metadata server 32 performs step 210, in which the metadata server 32 verifies the MAC, decrypts the encrypted set of keys using $PK_M$ to yield $C_x$-M-keys, and internally registers the client 40(x) as an authorized client 40 if the MAC is verified. As part of the registration, metadata server 32 stores the decrypted set of keys $C_x$-M-keys in association with client 40(x). Metadata server 32 then sends a registration confirmation 212 having a MAC encoded with the authentication key $C_x$-M-$K_a$ shared between the metadata server 32 and the client 40(x) to the client 40(x).

FIG. 4 also depicts a read procedure 220 for a client 40(x) to read data from a CMDFS managed by metadata server 32. Client 40(x) sends an access request 222 to metadata server 32. The access request 222 includes a filename (or other data indicator), a mode flag indicating READ mode, and a MAC encoded with the authentication key $C_x$-M-$K_a$ shared between the metadata server 32 and the client 40(x).

Upon receiving the access request 222, the metadata server 32 performs step 224. In step 224, metadata server 32 performs the following sub-steps: (a) Metadata server 32 first validates that the client 40(x) is permitted to read access the requested file. (b) If the client 40(x) is permitted to access the file, then MDS32 prepares a List of all block locations where portions of that file are to be found. For example, suppose that the requested file contains 10 blocks. If the CMDFS has a replication factor of three (i.e., every block is stored on three different data servers 36 for fault tolerance and load balancing purposes), then the List will have 10×3=30 entries. Each List entry, $L_i$, includes the following information: ($b_i$, $D_i$, $k_i$, $tok_i$, $exp_i$, $ciph_i$).

The value $b_i$ is a block identifier for the entry. Each of the (e.g., 10) blocks of the file will have a different block identifier, and the block identifier is also globally unique, serving to identify a particular block within the CMDFS. All (e.g., 3) replicated blocks will share a block identifier.

The value $D_i$ is a data server identifier for the entry, identifying the particular data server 36(y) that the block for that entry $L_i$ is stored on. Thus, in the example, although all three replicated blocks share a block identifier, they will have different data server identifiers, since the same block will be replicated on three different data servers 36 (e.g., data servers 36(1), 36(2), and 36(p)).

The value $k_i$ is a set of ephemeral keys which can be used for communications between the client 40(x) and the particular data server 36(y) identified by $D_i$ regarding block $b_i$. The set of ephemeral keys $k_i$ may include one or both of ephemeral encryption key $k_{ie}$ and ephemeral authentication key $k_{ia}$.

The value $exp_i$ is an expiration time for token $tok_i$ after which it will no longer be valid.

The value $tok_i$ is a token which proves that the client 40(x) is authorized to access the block $b_i$ through expiration time $exp_i$. The token $tok_i$ is a MAC encoded with authentication key $D_y$-M-$K_a$ 66, and the token $tok_i$ has form $MAC^{Dy\text{-}M\text{-}Ka}(C_x, b_i, \text{read mode}, exp_i)$, where $C_x$ is a client identifier for client 40(x).

The value $ciph_i$ is a ciphertext encrypted with the encryption key $D_y$-M-$K_e$ 68 of the data server 36(y) identified by $D_i$. The ciphertext $ciph_i$ has form $\{C_x, k_i\}^{Dy\text{-}M\text{-}Ke}$, which allows the ephemeral keys $k_i$ to be securely transmitted to the data server 36(y).

After generating the List, metadata server 32 is able to send read information message 226 to client 40(x) having the List, encrypted with $C_x$M-$K_e$ and a MAC encoded with the authentication key $C_x$-M-$K_a$ shared between the metadata server 32 and the client 40(x).

Upon receiving the read information message 226, the client 40(x) performs step 228. In step 228, metadata server 32 chooses a particular List entry $L_i$ to read data block $b_i$ from data server $D_i$. Metadata server 32 then sends access request 230 to data server $D_i$ (which, let us assume, is data server 36(y)). Access request 230 includes token $tok_i$ encrypted with the ephemeral encryption key $k_{ie}$ for that data server 36(y) (in order to protect $tok_i$ from being coopted by an attacker, it is combined with the client identifier and encrypted, resulting in $\{C_x, tok_i\}^k_{ie}$), a read mode flag, $ciph_i$ and a MAC encoded with the ephemeral authentication key $k_{ia}$. The block identifier $b_i$ and the expiration time $exp_i$ are also sent, either in plaintext or encrypted together with $C_x$ and $tok_i$.

Upon receiving the access request 230, the data server 36(y) performs method 232. Method 232 may include the following steps:

A. Receive, via the network, the access request 230 from a client 40(x), the access request 230 requesting read access to a portion of the data storage 52 of the data server 36(y).

B. Test whether the access request 230 includes a data server specific token $tok_i$ authenticating that the client 40(x) has been authorized by the metadata server 32 to access the portion of data storage 52; and C. In response to testing, provide the client 40(x) with access to the portion of data storage 52 on condition that the access request 230 includes the token $tok_i$ authenticating that the client 40(x) has been authorized by the metadata server 32 to access the portion of data storage 52. In the context of a READ operation, this includes sending data stored in the portion of data storage 52 (see read response 234 below).

Step B may include one or more of the following sub-steps:
i. Decrypt $ciph_i$ using $D_y$-M-$K_e$ 68.
ii. Extract the ephemeral keys $k_i$ from the decrypted $ciph_i$ and store them as ephemeral keys $k_e$ 82 and $k_a$ 84.
iii. Extract the client identifier $C_x$ from the decrypted $ciph_i$.
iv. Extract the token $tok_i$ from the access request 230 by decrypting it using ephemeral encryption key $k_e$ 82 and store it as token 86.
v. Compute a test token by applying a MAC algorithm using authentication key $D_y$-M-$K_a$ uniquely shared between the data server 36(y) and the metadata server 32 to a combination of an identifier of the client, an identifier of the portion of data storage, and an expiration time (e.g., ($C_x$, $b_i$, $exp_i$) or ($C_x$, $b_i$, read mode, $exp_i$)).

vi. Determine that the access request 230 includes the token $tok_i$ authenticating that the client 40($x$) has been authorized by the metadata server 32 to access the portion of data storage 52 if and only if the extracted token 86 matches the test token and the expiration time $exp_i$ is in the future.

In some embodiments, instead of performing sub-steps v and vi using a test token and a MAC algorithm, a digital signature verifying algorithm may be used instead. In these embodiments, instead of token $tok_i$ being a MAC, token $tok_i$ is a digital signature signed by the metadata server 32 using its private key $SK_M$. Thus, the digital signature verifying algorithm uses the public key $PK_M$ of the metadata server 32 to verify the signature.

Upon successfully completing method 230, data server 36($y$) retrieves the data with block identifier $b_i$ (e.g., data block 54) and sends the data or a portion thereof to the client 40($x$) encrypted using the ephemeral encryption key $k_e$ 82 as part of a read response 234, also including a MAC encoded with the ephemeral authentication key $k_a$ 84.

FIG. 5 depicts a write procedure 250 for a client 40($x$) to write data to a CMDFS managed by metadata server 32. Client 40($x$) sends an access request 252 to metadata server 32. The access request 252 includes a filename (or other data indicator), a mode flag indicating READ mode, a block identifier b, and a MAC encoded with the authentication key $C_x$-M-$K_a$ shared between the metadata server 32 and the client 40($x$).

Upon receiving the access request 252, the metadata server 32 performs step 254. In step 254, metadata server 32 performs the following sub-steps: (a) Metadata server 32 first validates that the client 40($x$) is permitted to access the requested file. (b) If the client 40($x$) is permitted to write access the file, then metadata server 32 chooses a particular block location where portions of that file are to be written. (c) Metadata server 32 then generates an entry for that particular block location, including the following information: (D, k, tok, exp, ciph).

The value b is a block identifier. Each of the blocks of the file will have a different block identifier, and the block identifier is also globally unique, serving to identify a particular block within the CMDFS. All replicated blocks will share a block identifier.

The value D is a data server identifier for the WRITE to be initially performed on, identifying a particular data server 36($y$). Although all several replicated blocks may share a block identifier, they will have different data server identifiers, since the same block will be replicated on several different data servers 36 (e.g., data servers 36(1), 36(2), and 36($p$)). Initially, only one of these data servers 36 is selected for the WRITE operation.

The value k is a set of ephemeral keys which can be used for communications between the client 40($x$) and the particular data server 36($y$) identified by D regarding block b. The set of ephemeral keys k may include one or both of ephemeral encryption key $k_e$ and ephemeral authentication key $k_a$.

The value exp is an expiration time for token tok, after which it will no longer be valid.

The value tok is a token which proves that the client 40($x$) is authorized to access the block b through expiration time exp. The token tok is a MAC encoded with authentication key $D_y$-M-$K_a$ 66, and the token tok has form $MAC^{Dy\text{-}M\text{-}Ka}(C_x, b,$ write mode, exp), where $C_x$ is a client identifier for client 40($x$).

The value ciph is a ciphertext encrypted with the encryption key $D_y$-M-$K_e$ 68 of the data server 36($y$) identified by D. The ciphertext ciph has form $\{C_x, k, D', ciph', tok'\}^{Dy\text{-}M\text{-}Ke}$, which allows the ephemeral keys k to be securely transmitted to the data server 36($y$). The value D' is an identifier of a next data server (e.g., data server 36($z$) to replicate the WRITE to after data server 36($y$). The value ciph' is a next ciphertext to be used in replicating the WRITE, and the value tok' is a next token which proves that data server 36($y$) is authorized to replicate the WRITE operation onto data server 36($z$). The next ciphertext ciph' has form $\{D_y, k, D'', ciph'', tok''\}^{Dy\text{-}M\text{-}Ke}$ and the next token tok' has form $MAC^{Dz\text{-}M\text{-}Ka}(D_y, b,$ write mode, exp').

After generating the entry, metadata server 32 is able to send write information message 256 to client 40($x$) having values (D, k, tok, exp) encrypted with $C_x$-M-$K_e$ and ciphertext ciph as well as a MAC encoded with the authentication key $C_x$-M-$K_a$ shared between the metadata server 32 and the client 40($x$).

Upon receiving the write information message 256, the client 40($x$) performs step 258. In step 228, metadata server 32 generates WRITE access request 260. Metadata server 32 then sends WRITE access request 260 to data server D (which, let us assume, is data server 36($y$)). Access request 260 includes token tok encrypted with the ephemeral encryption key $k_e$, for that data server 36($y$) (in order to protect tok from being coopted by an attacker, it is combined with the client identifier and encrypted, resulting in $\{C_x, tok\}^k_e$), a write mode flag, ciph, the data to be written encrypted using ephemeral encryption key $k_e$, and a MAC encoded with the ephemeral authentication key $k_a$. The block identifier b and the expiration time exp are also sent, either in plaintext or encrypted together with $C_x$ and tok.

Upon receiving the access request 260, the data server 36($y$) performs method 262. Method 262 may include the following steps:

A. Receive, via the network, the WRITE access request 260 from a client 40($x$), the WRITE access request 260 requesting write access to a portion of the data storage 52 of the data server 36($y$).

B. Test whether the WRITE access request 230 includes a data server specific token tok authenticating that the client 40($x$) has been authorized by the metadata server 32 to write access the portion of data storage 52; and C. In response to testing, provide the client 40($x$) with write access to the portion of data storage 52 on condition that the WRITE access request 260 includes the token tok authenticating that the client 40($x$) has been authorized by the metadata server 32 to access the portion of data storage 52. In the context of a WRITE operation, this includes decrypting and storing the received data to the portion of data storage 52.

D. Preparing a replication access request 264 to be sent to the next data server 36($z$) in the replication pipeline if there is a further data server remaining in the replication pipeline. Replication access request 264 includes token tok' encrypted with the same ephemeral encryption key $k_e$, to avoid requiring re-encryption (in order to protect tok' from being coopted by an attacker, it is combined with the data server identifier and encrypted, resulting in $\{D_y, tok\}^k_e$), a write mode flag, ciph', the data to be written encrypted using ephemeral encryption key $k_e$, (preferably with no re-encryption done), and a MAC encoded with the ephemeral authentication key $k_a$. The block identifier b and the expiration time exp' are also sent, either in plaintext or encrypted together with $D_y$ and tok.

Step B may include one or more of the following sub-steps:
  i. Decrypt ciph using $D_y$-M-$K_e$ 68.
  ii. Extract the ephemeral keys k from the decrypted ciph and store them as ephemeral keys $k_e$ 82 and $k_a$ 84.
  iii. Extract the client identifier $C_x$ from the decrypted ciph.
  iv. Extract the token tok from the WRITE access request 260 by decrypting it using ephemeral encryption key $k_e$ 82 and store it as token 86.
  v. Compute a test token by applying a MAC algorithm using authentication key $D_y$-M-$K_a$ uniquely shared between the data server 36(y) and the metadata server 32 to a combination of an identifier of the client, an identifier of the portion of data storage, and an expiration time (e.g., ($C_x$, b, exp) or ($C_x$, b, write mode, exp)).
  vi. Determine that the WRITE access request 260 includes the token tok authenticating that the client 40(x) has been authorized by the metadata server 32 to write access the portion of data storage 52 if and only if the extracted token 86 matches the test token and the expiration time exp is in the future.

In some embodiments, instead of performing sub-steps v and vi using a test token and a MAC algorithm, a digital signature verifying algorithm may be used instead. In these embodiments, instead of token tok being a MAC, token tok is a digital signature signed by the metadata server 32 using its private key $SK_M$. Thus, the digital signature verifying algorithm uses the public key $PK_M$ of the metadata server 32 to verify the signature.

Upon successfully completing method 260, if there is a further data server (e.g., data server 36(z)) remaining in the replication pipeline, data server 36(y) sends replication access request 264 to the next data server (e.g., data server 36(z)) in the replication pipeline, as identified by D' from ciph.

Upon receiving the replication access request 264, the data server 36(z) performs method 264, which is similar to method 262. Thus, data server 36(z) locally performs the write operation if the token tok' authenticates that the client 40(x) has been authorized by the metadata server 32 to write access the portion of data storage 52 and forwards on another replication access request if there are still any remaining data servers in the replication pipeline. Eventually, data server 36(z) sends a replication access response 268 back to data server 36(y) indicating the status of the write operation and a MAC encoded with the ephemeral authentication key $k_a$ 84. Upon receiving the replication access response 268, data server 36(y) sends a WRITE access response 270 back to client 40(x) indicating the status of the write operation and a MAC encoded with the ephemeral authentication key $k_a$ 84.

Techniques have been described for the metadata server 32 to provide specialized tokens that prove that a specific client 40 is authorized to access particular data on a particular data server 36. Techniques have also been presented for providing encrypted pathways between data servers and clients and for preventing unauthorized entities from registering as data servers.

While various embodiments of the present disclosure have been particularly shown and described, it will be understood by those skilled in the art that various changes in form and details may be made therein without departing from the spirit and scope of the present disclosure as defined by the appended claims.

For example, it should be understood that any time a computing device, such as, for example, data server 36(y) is described as performing a method, process, step, or function, what is meant is that the computing device performs the method, process, step, or function when executing software instructions (e.g., storage application 62) on processor (e.g., processor 56).

As an additional example, it should be understood that, although various embodiments have been described in the context of a CMDFS, this is by way of example only. Thus, certain embodiments apply the principles described above to other distributed data storage systems with centralized metadata, such as distributed databases with centralized metadata and distributed block storage systems with centralized metadata.

As an additional example, although various embodiments have been described as methods, other embodiments include computer program products embodying these methods. One such embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer or other computerized apparatus, which is programmed with instructions, which, when executed on one or more processors of the computerized apparatus, cause the processor(s) to perform one or more of the methods described.

Furthermore, it should be understood that an approach similar to that disclosed herein is described in "Hardening Access Control and Data Protection in GFS-like File Systems," by James Kelley, Roberto Tamassia, and Nikos Triandopoulos, published in Lecture Notes in Computer Science (LNCS) Vol. 7459, pp. 19-36, 17th European Symposium on Research in Computer Security (ESORICS), Pisa, Italy, Sep. 10-12, 2012, Proceedings, Springer-Verlag Berlin Heidelberg 2012, Sara Foresti, Moti Yung, Fabio Martinelli, Eds. The contents and teaching of that publication are incorporated herein by this reference in their entirety.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a data server of a plurality of data servers connected to a network, the data server including data storage managed by a remote metadata server, the metadata server managing storage of data across the plurality of data servers, the method comprising:
  receiving, via the network, an access request from a client, the access request requesting access to a portion of the data storage of the data server;
  testing whether the access request includes a data server specific token authenticating that the client has been authorized by the metadata server to access the portion of data storage;
  in response to testing, providing the client with access to the portion of data storage on condition that the access request includes the token authenticating that the client has been authorized by the metadata server to access the portion of data storage;

extracting a ciphertext from within the access request, the ciphertext having been provided to the client by the metadata server; and decrypting the ciphertext using a first encryption key to learn a second encryption key, the first encryption key being uniquely shared between the metadata server and the data server, the second encryption key having been assigned, for a limited period of time, by the metadata server for protecting interactions between the client and the data server, the second encryption key having been cryptographically embedded by the metadata server within the ciphertext using the first encryption key, the metadata server having provided the ciphertext to the client;

wherein providing the client with access to the portion of data storage includes cryptographically exchanging data with the client using the second encryption key learned from decrypting the ciphertext from the access request, the second encryption key having also been provided to the client by the metadata server encrypted using a third encryption key uniquely shared between the metadata server and the client.

2. The method of claim 1 wherein testing includes:
extracting the token from the access request;
computing a test token by applying a message authentication code algorithm using an authentication key uniquely shared between the data server and the metadata server to a combination of an identifier of the client, an identifier of the portion of data storage, and an expiration time; and
determining that the access request includes the token authenticating that the client has been authorized by the metadata server to access the portion of data storage if and only if the extracted token matches the test token and the expiration time is in the future.

3. The method of claim 1 wherein cryptographically exchanging data with the client using the second encryption key includes:
reading data from the portion of the data storage of the data server;
encrypting the read data using the second encryption key; and
sending the encrypted data to the client over the network.

4. The method of claim 1 wherein cryptographically exchanging data with the client using the second encryption key includes:
receiving encrypted data to be written to the portion of the data storage of the data server from the client over the network;
decrypting the received data using the second encryption key; and
storing the decrypted data in the portion of the data storage of the data server.

5. The method of claim 4 wherein:
decrypting the ciphertext using the first encryption key further includes learning another ciphertext, another token, and an identity of a next data server of the plurality of data servers; and
the method further comprises sending another access request to another data server identified by the learned identity of the next data server, wherein the other access request includes:
the other ciphertext, the other ciphertext including the second encryption key encrypted by the metadata server using a fourth encryption key uniquely shared between the metadata server and the other data server;
the other token, encrypted using the second encryption key; and
the encrypted data.

6. The method of claim 1 wherein testing includes:
extracting the token from the access request;
applying a signature verifying algorithm to the token using a public key of the metadata server to determine whether a combination of an identifier of the client, an identifier of the portion of data storage, and an expiration time the token had been signed by the metadata server using a private key of the metadata server to yield the token; and
determining that the access request includes the token authenticating that the client has been authorized by the metadata server to access the portion of data storage if and only if the signature verifying algorithm verifies that the combination had been signed by the metadata server using a private key of the metadata server to yield the token.

7. The method of claim 1 wherein the data server further includes additional data storage managed by another metadata server separate from the metadata server, the method further comprising:
receiving, via the network, another access request from another client, the other access request requesting access to another portion of the additional data storage of the data server;
testing whether the other access request includes another data server specific token authenticating that the other client has been authorized by the other metadata server to access the other portion of the additional data storage; and
in response to testing, providing the other client with access to the other portion of the additional data storage on condition that the other access request includes the other token authenticating that the other client has been authorized by the other metadata server to access the additional portion of data storage.

8. The method of claim 1 wherein the data storage is also jointly managed by another metadata server, the other metadata server mirroring the metadata server, the method further comprising:
receiving, via the network, another access request from another client, the other access request requesting access to another portion of the data storage of the data server;
testing whether the other access request includes another data server specific token authenticating that the other client has been authorized by the other metadata server to access the other portion of data storage; and
in response to testing, providing the other client with access to the other portion of data storage on condition that the other access request includes the other token authenticating that the other client has been authorized by the other metadata server to access the other portion of data storage.

9. A method performed by a data server of a plurality of data servers connected to a network, the data server including data storage managed by a remote metadata server, the metadata server managing storage of data across the plurality of data servers, the method comprising:
receiving, via the network, an access request from a client, the access request requesting access to a portion of the data storage of the data server;
testing whether the access request includes a data server specific token authenticating that the client has been authorized by the metadata server to access the portion of data storage; and in response to testing, providing the client with access to the portion of data storage on condition that the access request includes the token authenticating that the client has been authorized by the metadata server to access the portion of data storage;
wherein testing includes:
  extracting the token from the access request;
  computing a test token by applying a message authentication code algorithm using an authentication key uniquely shared between the data server and the metadata server to a combination of an identifier of the client, an identifier of the portion of data storage, and an expiration time; and
  determining that the access request includes the token authenticating that the client has been authorized by the metadata server to access the portion of data storage if and only if the extracted token matches the test token and the expiration time is in the future;
wherein the method further comprises, prior to receiving the access request from the client, engaging in a registration procedure with the metadata server, wherein engaging in the registration procedure with the metadata server includes:
  generating the authentication key;
  encrypting the generated authentication key using a public key of the metadata server, thereby generating a ciphertext;
  embedding the ciphertext within a registration message;
  sending the registration message to a trusted administrator;
  in response to sending, receiving an administrator signature from the administrator, the administrator signature being a cryptographic signature of the registration message with a private key of the administrator; and
  sending the registration message and the received administrator signature to the metadata server for validation.

10. The method of claim 9 wherein extracting the token from the access request includes decrypting the token using an encryption key received from the metadata server for protecting interactions between the client and the data server, the token having been encrypted by the client using the encryption key, wherein the encryption key is valid for a limited period of time.

11. The method of claim 9 wherein the method further comprises, by the metadata server:
  receiving the registration message and the administrator signature from the data server;
  verifying the administrator signature;
  decrypting the ciphertext to regenerate the authentication key;
  in response to verifying the administrator signature, registering the data server for remote management by the metadata server in connection with the decrypted authentication key.

12. A data server apparatus comprising:
  data storage managed by a remote metadata server, the metadata server managing storage of data across a plurality of data servers;
  a network interface;
  a processor; and
  memory, the memory storing instructions, which when performed by the processor, cause the apparatus to perform the following operations:
    receiving, via the network interface, an access request from a client, the access request requesting access to a portion of the data storage;
    testing whether the access request includes a data server specific token authenticating that the client has been authorized by the metadata server to access the portion of data storage;
    in response to testing, providing the client with access to the portion of data storage on condition that the access request includes the token authenticating that the client has been authorized by the metadata server to access the portion of data storage;
    extracting a ciphertext from within the access request, the ciphertext having been provided to the client by the metadata server; and
    decrypting the ciphertext using a first encryption key to learn a second encryption key, the first encryption key being uniquely shared between the metadata server and the data server apparatus, the second encryption key having been assigned, for a limited period of time, by the metadata server for protecting interactions between the client and the data server apparatus, the second encryption key having been cryptographically embedded by the metadata server within the ciphertext using the first encryption key, the metadata server having provided the ciphertext to the client;
  wherein the operation of providing the client with access to the portion of data storage includes cryptographically exchanging data with the client using the second encryption key learned from decrypting the ciphertext from the access request, the second encryption key having also been provided to the client by the metadata server encrypted using a third encryption key uniquely shared between the metadata server and the client.

13. The data server apparatus of claim 12 wherein the operation of testing includes:
  extracting the token from the access request;
  computing a test token by applying a message authentication code algorithm using an authentication key uniquely shared between the data server apparatus and the metadata server to a combination of an identifier of the client, an identifier of the portion of data storage, and an expiration time; and
  determining that the access request includes the token authenticating that the client has been authorized by the metadata server to access the portion of data storage if and only if the extracted token matches the test token and the expiration time is in the future.

14. The data server apparatus of claim 12 wherein the operation of cryptographically exchanging data with the client using the second encryption key includes:
  reading data from the portion of the data storage of the data server apparatus;
  encrypting the read data using the second encryption key; and
  sending the encrypted data to the client via the network interface.

15. The data server apparatus of claim 12 wherein the operation of cryptographically exchanging data with the client using the second encryption key includes:
  receiving encrypted data to be written to the portion of the data storage of the data server apparatus from the client via the network interface;
  decrypting the received data using the second encryption key; and
  storing the decrypted data in the portion of the data storage of the data server apparatus.

16. The data server apparatus of claim 15 wherein:
  the operation of decrypting the ciphertext using the first encryption key further includes learning another ciphertext, another token, and an identity of a next data server of the plurality of data servers; and the instructions, when performed by the processor, further cause the data server apparatus to perform the operation of sending another access request to another data server identified by the learned identity of the next data server, wherein the other access request includes:

the other ciphertext, the other ciphertext including the second encryption key encrypted by the metadata server using a fourth encryption key uniquely shared between the metadata server and the other data server;

the other token, encrypted using the second encryption key; and the encrypted data.

17. A data server apparatus comprising:

data storage managed by a remote metadata server, the metadata server managing storage of data across a plurality of data servers;

a network interface;

a processor; and memory, the memory storing instructions, which when performed by the processor, cause the apparatus to perform the following operations:

receiving, via the network interface, an access request from a client, the access request requesting access to a portion of the data storage;

testing whether the access request includes a data server specific token authenticating that the client has been authorized by the metadata server to access the portion of data storage; and in response to testing, providing the client with access to the portion of data storage on condition that the access request includes the token authenticating that the client has been authorized by the metadata server to access the portion of data storage;

wherein the operation of testing includes:

extracting the token from the access request;

computing a test token by applying a message authentication code algorithm using an authentication key uniquely shared between the data server apparatus and the metadata server to a combination of an identifier of the client, an identifier of the portion of data storage, and an expiration time; and determining that the access request includes the token authenticating that the client has been authorized by the metadata server to access the portion of data storage if and only if the extracted token matches the test token and the expiration time is in the future;

wherein the instructions, when performed by the processor, further cause the apparatus to, prior to receiving the access request from the client, perform the operation of engaging in a registration procedure with the metadata server, wherein the operation of engaging in the registration procedure with the metadata server includes:

generating the authentication key;

encrypting the generated authentication key using a public key of the metadata server, thereby generating a ciphertext;

embedding the ciphertext within a registration message;

sending the registration message to a trusted administrator via the network interface;

in response to sending, receiving an administrator signature from the administrator via the network interface, the administrator signature being a cryptographic signature of the registration message with a private key of the administrator; and sending, via the network interface, the registration message and the received administrator signature to the metadata server for validation.

18. The data server apparatus of claim 17 wherein the operation of extracting the token from the access request includes decrypting the token using an encryption key received from the metadata server for protecting interactions between the client and the data server apparatus, the token having been encrypted by the client using the encryption key, wherein the encryption key is valid for a limited period of time.

19. A computer program product comprising a non-transitory computer-readable storage medium, storing instructions, which, when performed by a data server computer, cause the data server computer to perform the following operations:

receiving, via a network, an access request from a client, the access request requesting access to a portion of data storage of the data server computer, the data storage being managed by a remote metadata server, the metadata server managing storage of data across a plurality of data server computers;

testing whether the access request includes a data server specific token authenticating that the client has been authorized by the metadata server to access the portion of data storage;

in response to testing, providing the client with access to the portion of data storage on condition that the access request includes the token authenticating that the client has been authorized by the metadata server to access the portion of data storage;

extracting a ciphertext from within the access request, the ciphertext having been provided to the client by the metadata server; and decrypting the ciphertext using a first encryption key to learn a second encryption key, the first encryption key being uniquely shared between the metadata server and the data server computer, the second encryption key having been assigned, for a limited period of time, by the metadata server for protecting interactions between the client and the data server computer, the second encryption key having been cryptographically embedded by the metadata server within the ciphertext using the first encryption key, the metadata server having provided the ciphertext to the client;

wherein the operation of providing the client with access to the portion of data storage includes cryptographically exchanging data with the client using the second encryption key learned from decrypting the ciphertext from the access request, the second encryption key having also been provided to the client by the metadata server encrypted using a third encryption key uniquely shared between the metadata server and the client.

* * * * *